United States Patent [19]

Clegg

[11] Patent Number: 4,611,577

[45] Date of Patent: Sep. 16, 1986

[54] BLACK-WATER SOLAR DISK

[76] Inventor: John E. Clegg, 2320 Keystone Dr., Orlando, Fla. 32806

[21] Appl. No.: 728,908

[22] Filed: Apr. 30, 1985

[51] Int. Cl.[4] ................................................. F24J 2/24
[52] U.S. Cl. .................................. 126/444; 126/450; 126/451
[58] Field of Search .............. 126/440, 450, 451, 436, 126/417, 444, 445

[56] References Cited

U.S. PATENT DOCUMENTS 4,136,670  1/1979  Davis ................................... 126/440
4,221,210  9/1980  Cuijanovich ................... 126/900 X Primary Examiner—Larry Jones

[57] ABSTRACT

A flat circular plate glass window and a conical circular metal disk mounted below the window so as to form an expansion chamber through which a black-dye solution of water and alcohol circulates. Water enters the chamber through a 1 mm peripheral gap between the window and disk and exits through a vertical pipe located at the center of the chamber 15 mm below the window. The heated water expands outward against the tapered walls of the chamber and deflects in the direction of flow, thereby increasing the rate of flow.

1 Claim, 3 Drawing Figures

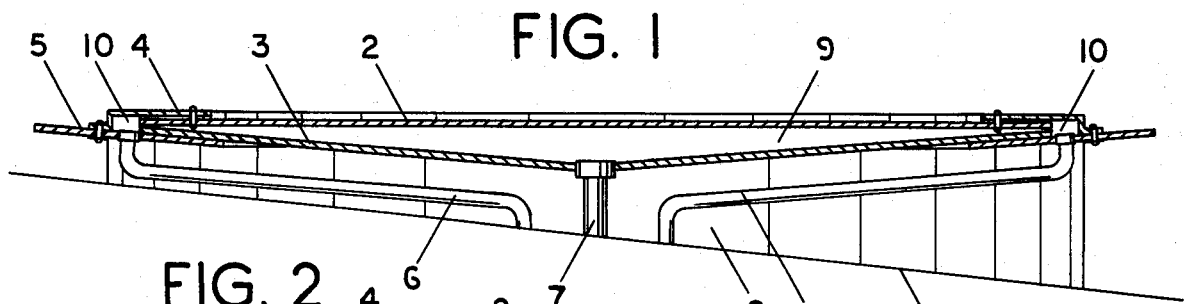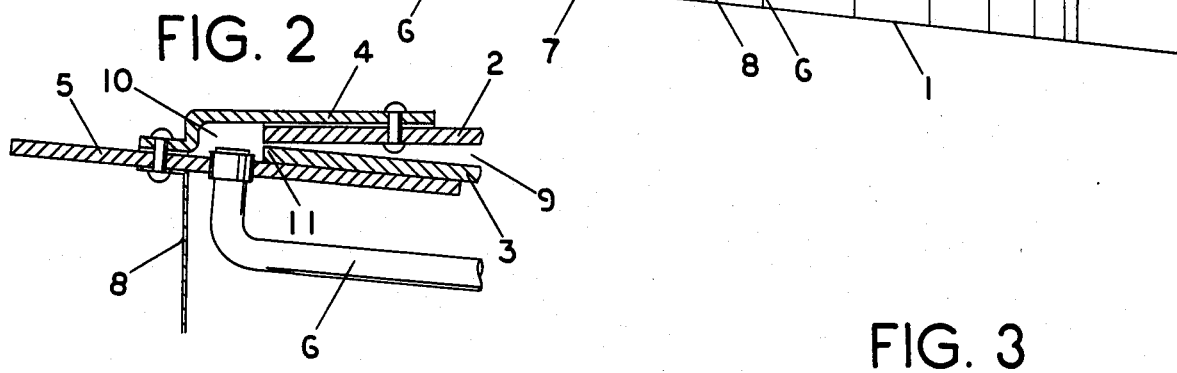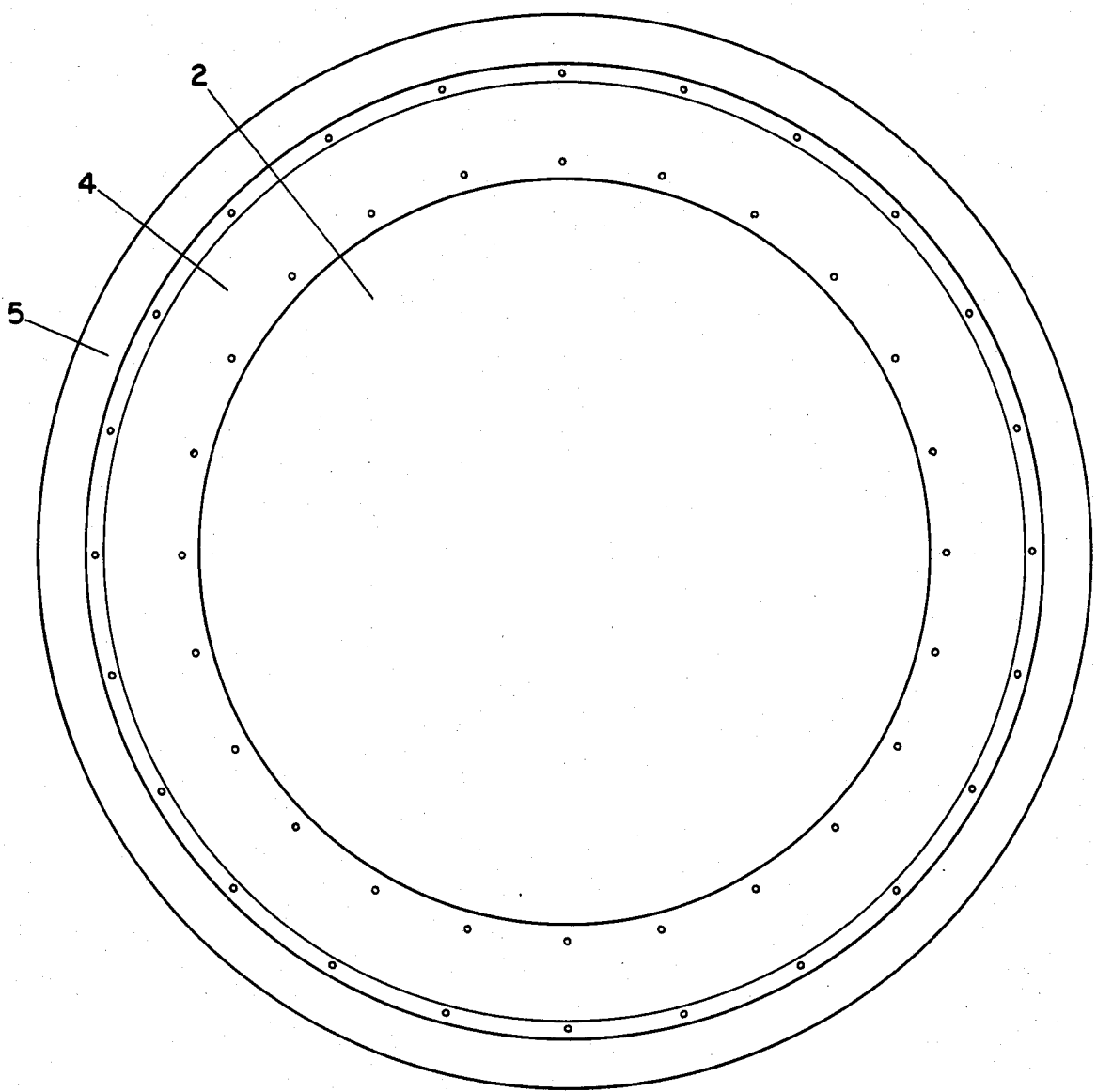

BLACK-WATER SOLAR DISK

BACKGROUND

Prior art is limited to clear-water ponds and pools which store the heat of solar radiation and transfer the heat to domestic water circulating through pipes submerged in the ponds and pools.

There is no prior art featuring black-water and a tapered expansion disk such as disclosed herein.

Concurrent art includes the *Black-Water Solar Collector*, Ser. No. 727,938, filed Apr. 26, 1985, by this inventor. In this invention domestic household water circulates through expansion tubes mounted inside a tank of standing solar-heated black water.

SUMMARY

The objects of this invention are to provide a passive solar heating system in which the heat of solar radiation is absorbed directly by black water and to provide a system in which the expansion of heated water is used as a means of circulating the water through radiant ceiling panels.

The primary source of heat is by direct absorption of solar radiation into the water. Secondary sources are by conduction through the plate glass window and by conduction through the metal disk which receives heat from an exposed flange.

The use of the forces of thermal expansion to circulate the water eliminates the need of pumping the water.

DRAWINGS

FIG. 1 is an elevation of the black-water solar disk mounted on a sloping roof.

FIG. 2 is an enlarged view of the outer portion of the disk.

FIG. 3 is a top view of the disk.

DESCRIPTION

FIG. 1 is an elevation of the black-water solar disk mounted on a sloping roof indicated by roof line 1. The disk consists of flat circular plate glass window 2, conical circular metal disk 3, annular metal plate 4, flange plate 5, inlet tubes 6, outlet tube 7 and housing 8.

Expansion chamber 9 is formed by window 2 and disk 3.

Annular inlet manifold 10 is formed by plate 4, flange plate 5 and the vertical edges of window 2 and disk 3.

FIG. 2 is an enlarged view of the outer portion of the black-water solar disk showing peripheral gap 11 of 1 mm between the edges of window 2 and disk 3.

The interior height of the expansion chamber 9 in the center is 15 mm.

Window 2 is horizontal, and disk 3 is inclined 5° from horizontal.

Black dye is added to water to render the water opaque to the transmission of solar radiation, and alcohol is added to prevent freezing during inoperative stages.

In operation cool water enters the system through four inlet tubes 6. The water circulates around inlet manifold 10 and enters the expansion chamber 9 through peripheral gap 11.

The water has been preheated by inlet tubes 6 which receive radiation from the bottom of disk 3 and which are enclosed in housing 8, by flange plate 5 which is exposed at its outer edge to solar radiation, and by annular metal plate 4.

The water begins to boil as it passes inward and absorbs heat directly from solar radiation. Expansion chamber 9 is 3 mm thick just inside the annular metal plate 4, and the water expands both upward against the window 2 and downward against the disk 3 and deflects in the direction of flow. The water continues to boil as it moves inward, and there is deflection off both window 2 and disk 3 despite the increased dimensions of the expansion chamber 9.

FIG. 3 shows the relative dimensions of the parts exposed to the sun.

I claim:

1. A black-water solar collector comprising, a flat circular plate glass window (2), a conical circular metal disk (3) having a center aperature and vertical outer edges, an annular metal plate (4), a flange plate (5), inlet tubes (6), an outlet tube (7) and a housing (8); the aforementioned parts in combination forming;
   a. an expansion chamber (9) formed by said flat glass window (2) mounted above said conical disk (3), the conical surfaces of said disk inclined 5° from the horizontal, with the interior vertical dimensions of chamber (9) being 1 mm at the outside edge and 15 mm at the center,
   b. a peripheral gap (11) of 1 mm formed by plate (4), flange plate (5) and the vertical outer edges of window (2) and disk (3),
   c. an inlet means formed by the communication of said inlet tubes (6) with an annular inlet manifold (10) and the communication of said inlet manifold (10) with peripheral gap (11),
   d. an outlet means formed by the communication of the center aperature of said conical disk with the outlet tube (7), and
   e. water to which a black dye has been added to render the water opaque to the transmission of light.

* * * * *